(12) United States Patent
Uhl et al.

(10) Patent No.: US 6,787,028 B2
(45) Date of Patent: Sep. 7, 2004

(54) OPERATING SUBSTANCE TANK, ESPECIALLY FOR A PORTABLE HANDHELD WORK APPARATUS

(75) Inventors: Klaus-Martin Uhl, Baltmannsweiler (DE); Thomas Schweigert, Kernen (DE); Florian Hoche, Stuttgart (DE)

(73) Assignee: Andreas Stihl AG & Co., Waiblingen (DE)

( * ) Notice: Subject to any disclaimer, the term of this patent is extended or adjusted under 35 U.S.C. 154(b) by 60 days.

(21) Appl. No.: 09/916,291

(22) Filed: Jul. 30, 2001

(65) Prior Publication Data

US 2002/0017024 A1 Feb. 14, 2002

(30) Foreign Application Priority Data

Aug. 4, 2000  (DE) .......................................... 100 38 140

(51) Int. Cl.[7] ............................................. B01D 35/027
(52) U.S. Cl. ....................... 210/171; 210/172; 210/320; 210/483; 210/521
(58) Field of Search ................................ 210/162, 171, 210/172, 299, 305, 320, 435, 454, 483, 488, 498, 499, 521; 184/6.24; 30/515

(56) References Cited

U.S. PATENT DOCUMENTS

| 4,476,021 | A | * | 10/1984 | Souza | ........................ 210/307 |
| 4,602,656 | A | * | 7/1986 | Nagashima et al. | ........ 137/590 |
| 5,259,953 | A | * | 11/1993 | Baracchi et al. | ............ 210/232 |
| 5,896,669 | A | | 4/1999 | Uhl | |

FOREIGN PATENT DOCUMENTS

JP            54-17573       *  2/1979  .................. 210/162

* cited by examiner

Primary Examiner—Matthew O. Savage
(74) Attorney, Agent, or Firm—Walter Ottesen

(57) ABSTRACT

The invention relates to an operating substance tank (1), especially for a portable handheld work apparatus (2) having a fill opening (3) and an outflow opening (4). The operating substance tank (1) is configured from a first housing part (6) and a second housing part (7) connected to the first housing part in order to configure the operating substance tank (1) in a simple assembly so that the operating substance can be made available without disruption. A filter wall (8) is configured as one piece from a housing part (6) and partitions the tank housing (5) of the operating substance tank (1) into at least two spaces (9, 10).

13 Claims, 6 Drawing Sheets

OPERATING SUBSTANCE TANK, ESPECIALLY FOR A PORTABLE HANDHELD WORK APPARATUS

BACKGROUND OF THE INVENTION

U.S. Pat. No. 5,896,669 discloses an operating substance tank for a portable handheld work apparatus, namely, for an overhead branch cutter. The tank is configured as one piece and has a fill opening for lubricating oil as well as a discharge opening for conducting the lubricating oil to a guide bar having a saw chain running along the periphery thereof. The operating substance tank is connected to an attachment flange for the guide bar. The operating substance tank includes a filter platelet as filter on its discharge opening for the lubricating oil conducted away by a piston pump. In operation, dirt particles are carried into the tank housing when filling the operating substance tank and can lead to a clogging of the discharge opening because of the small filter area which is available.

SUMMARY OF THE INVENTION

It is an object of the invention to improve an operating substance tank of the kind described above so that a cloggage of the discharge opening is prevented over a long service life and with a simple configuration.

The operating substance tank of the invention includes an operating substance tank for a portable handheld work apparatus. The operating substance tank includes: a tank housing having a tank interior and including a first housing part; and, a second housing part connected to the first housing part and defining the tank interior conjointly therewith; a filter wall configured as one piece with one of the first and second housing parts; the filter wall partitioning the tank housing into at least first and second spaces; and, the tank including a fill opening and an outflow connection through which the operating substance is drawn.

The operating substance tank is configured of a first housing part and a second housing part. With this configuration, it is possible to configure an internal filter wall on one of the housing parts so that the interior space of the tank is partitioned into two spaces, namely, a dirt or contamination space and a clean space. The filter wall provides a large filter surface which cannot become clogged even after a long time of use.

In a preferred embodiment, the filter wall is made up of lamellae having a gap between each two mutually adjacent ones of the lamellae. The lamellae project out of a wall of one housing part in the direction of the other housing part and terminate preferably in a partition plane between the first and second housing parts. The lamellae lie with their free ends, which face away from the wall, against the second housing part. The cross section of the lamellae is S-shaped or Z-shaped to improve the deposition of dirt thereon. With this constructive measure, dirt particles are better held back during the passage of the operating substance through the filter wall from the dirt space into the clean space. The fill opening is arranged on a wall of the tank housing of the operating substance tank on the dirt space side and the discharge opening is arranged at the clean space side.

It can be practical to configure the first housing part to have an L-shape when viewed in plan and to have a trough-shape when viewed in cross section. The filter wall extends into the tank interior space in an extension of an outer wall of the first housing part. The two housing parts of the operating substance tank are connected to each other with a solid material seal interposed on the partition surfaces of the housing parts. The solid material seal is preferably preformed as one piece. It can be practical to utilize a two-component sealing mass sprayed onto the partition surfaces of a housing part and set.

To minimize mechanical wear of the operating substance tank, the housing parts of the operating substance tank are preferably injection molded from a fiber-reinforced plastic having a correspondingly large wall thickness. The operating substance tank can, however, also be formed of a housing part of plastic and a housing part which is a part of an apparatus housing of a portable handheld work apparatus. If, for example, the operating substance tank functions to make available lubricating oil for a work tool of an overhead branch cutter, then it is practical to arrange the operating substance tank on the side of an attachment flange of the overhead branch cutter in order to obtain a minimized conveyance path to the work tool. This side of the attachment flange lies opposite to the work tool.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
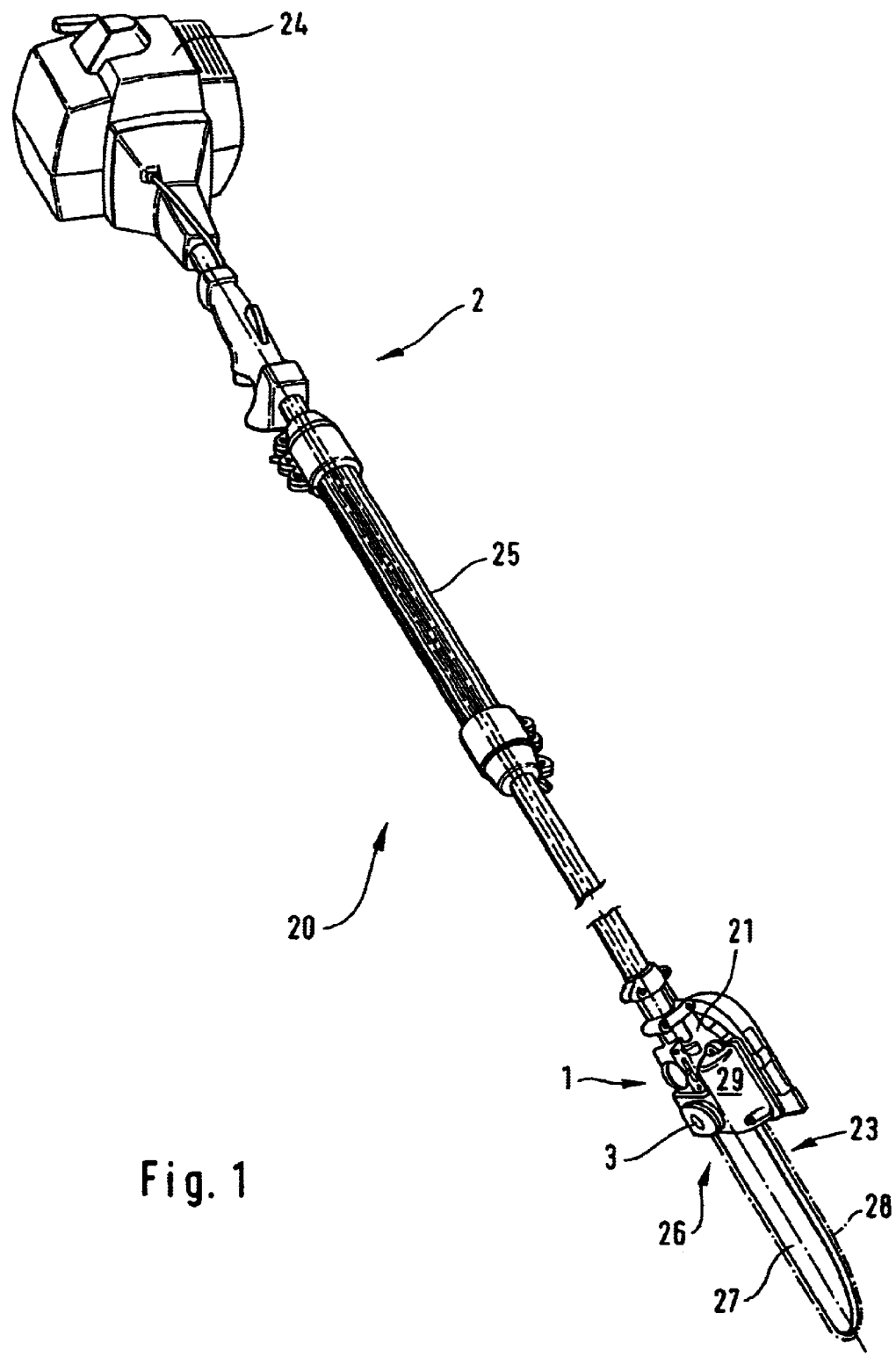
FIG. 1 is a perspective view of the operating substance tank according to the invention arranged on a portable handheld work apparatus.

The portable handheld work apparatus 2 of FIG. 1 functions to cut branches from trees or the like and is herein referred to as an overhead branch cutter 20. The portable handheld work apparatus 2 is driven by a drive motor 24 at one end of a telescopic rod 25. A work tool 23 is configured as a cutterhead 26 in the embodiment shown and is mounted on an end of the telescopic rod 25 opposite the drive motor 24 and is driven. The work tool 23 comprises essentially an apparatus housing 21 having a guide bar 27 fixedly mounted thereon. A saw chain 28 runs on the periphery of the guide bar. An operating substance tank 1 has a fill opening 3 and is mounted on the cutterhead 26 of the work apparatus 2 and functions, in the overhead branch cutter shown, to store lubricating oil 29 for the saw chain 25.

Figure 2:
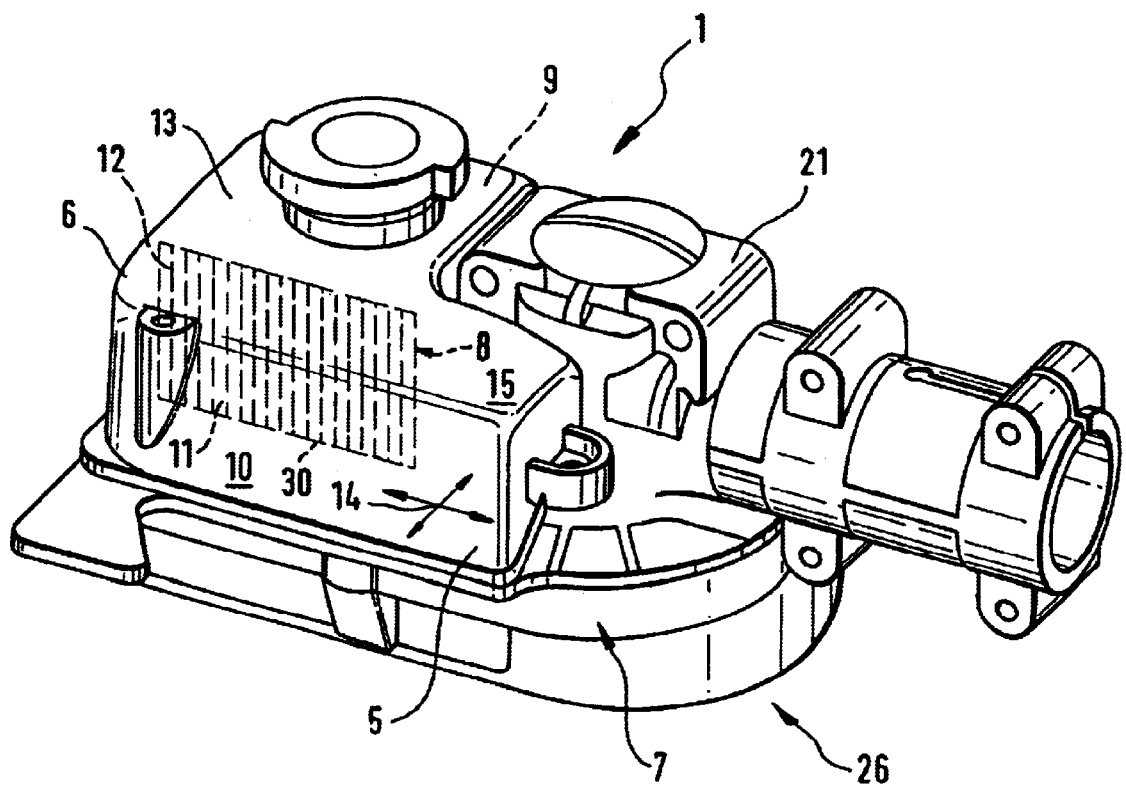
FIG. 2 is a perspective view of the operating substance tank according to the invention arranged on the apparatus housing of the overhead branch cutter of FIG. 1.
Figure 3:
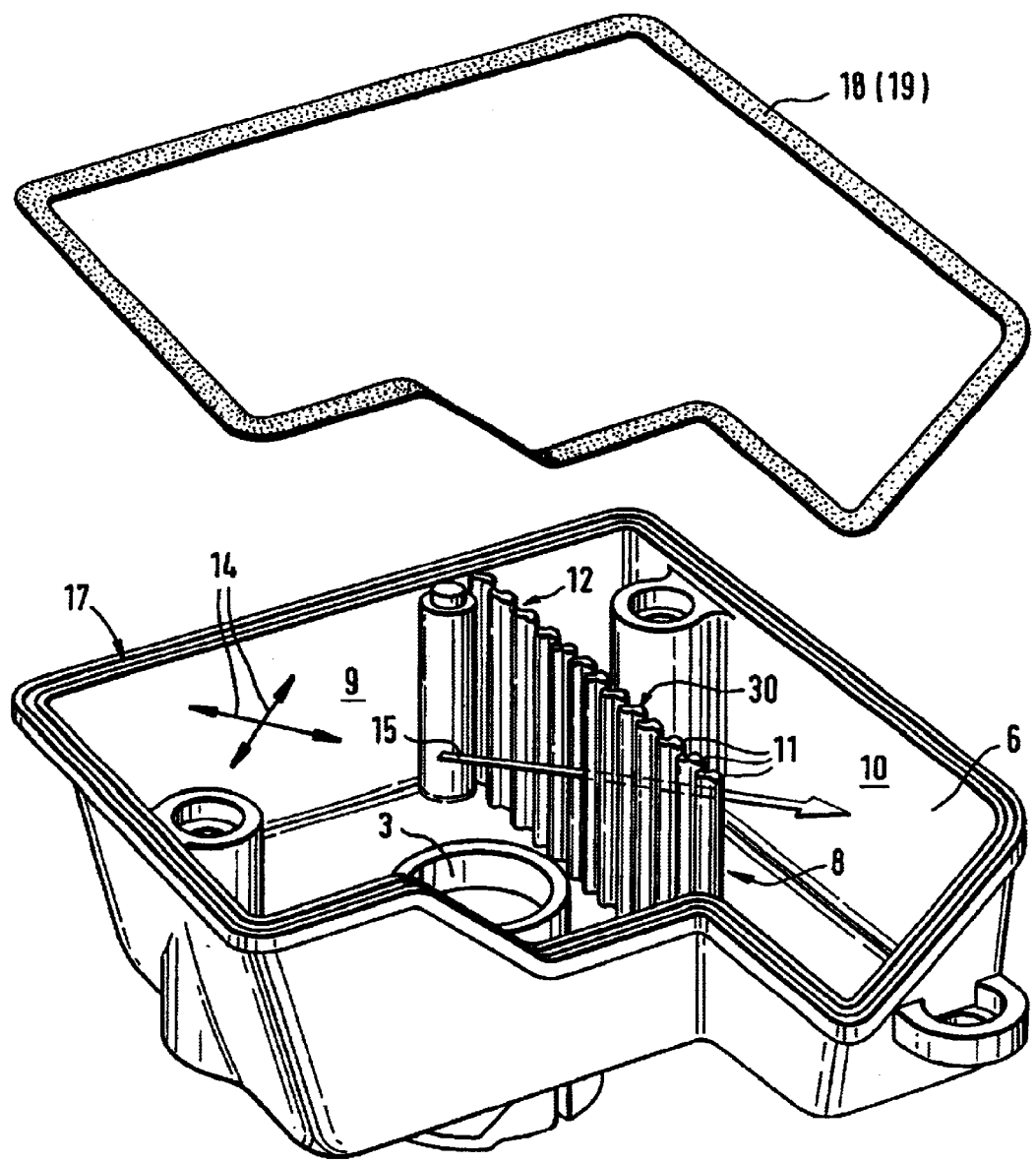
FIG. 3 is a perspective view of a first housing part of the operating substance tank.
Figure 4:
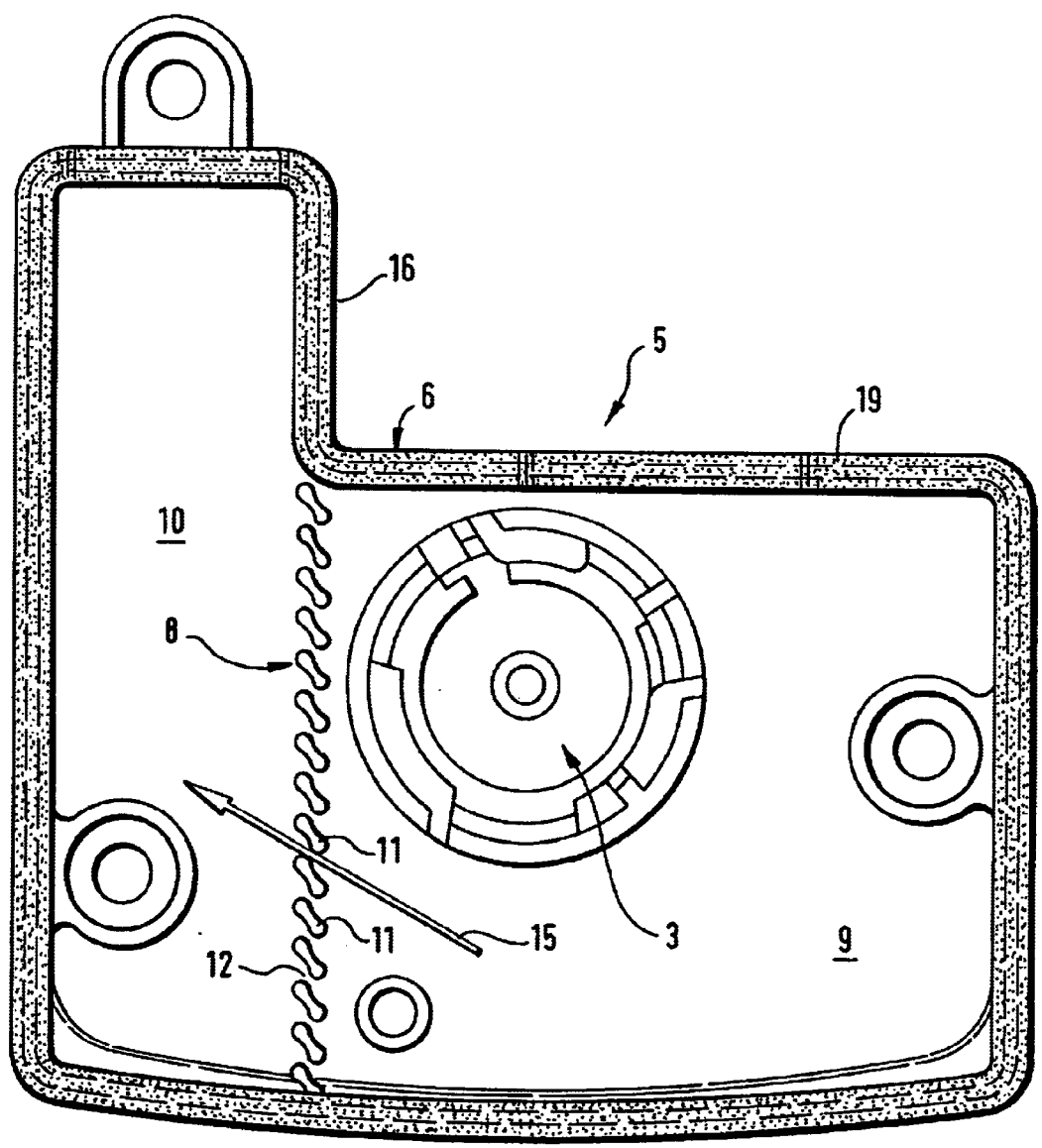
FIG. 4 is a plan view of the first housing part of FIG. 3.

FIGS. 2, 3 and 4 show the operating substance tank 1 in a preferred embodiment on the apparatus housing 21 of a portable handheld work apparatus 2 shown in FIG. 1. FIG. 2 is a perspective view of the operating substance tank 1 according to the invention and shows the operating substance tank arranged on the apparatus housing 21, especially on the cutterhead 26. The tank housing 5 of the operating substance tank 1 is formed of a first housing part 6 and of a second housing part 7 connected to the first housing part 6. The two housing parts (6, 7) are connected to each other with threaded fasteners.

Figure 6:
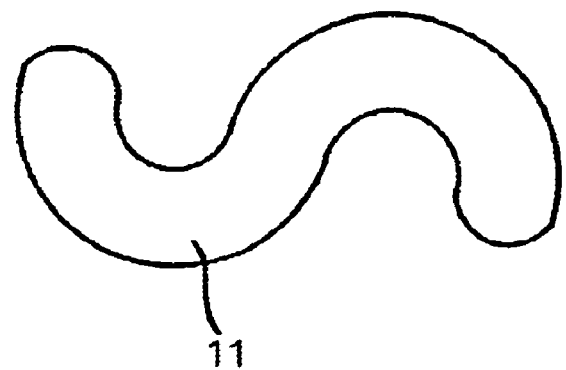
FIG. 6 is a section view of a lamella having an S configuration.
Figure 7:
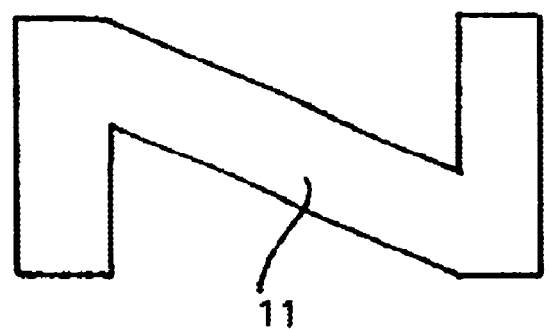
FIG. 7 is a section view of a lamella having a Z configuration.

An inner filter wall 8 is formed on the wall 13 of the first housing part 6 as one piece. The filter wall 8 has an edge 30 which faces away from the wall 13 of the first housing part 6 and ends in a partition plane 14 between the first and second housing parts. The filter wall 8 is formed of small rod-shaped lamellae 11 arranged approximately parallel to each other. A narrow gap 12 is formed between each two mutually adjacent ones of the lamellae. An operating substance 15 passes therethrough from a first space 9 (a dirt space) into a second space 10 (a clean space). As especially shown in a plan view of the interior of the first housing part 6 in FIG. 4, the lamellae 11 are configured to have an S-shape or Z-shape in cross section as shown in FIGS. 6 and 7. During operation, the operating substance 15 is filled into the first space 9 of the tank housing 5 via the fill opening 3 and flows through the gaps 12 between the lamellae 11 into the second space 10. The operating substance is drawn off via a discharge opening 4 (see FIG. 5) from space 10 as required. An improved degree of deposition on the filter wall 8 is achieved with the S-shaped or Z-shaped cross-sectional form of the lamellae 11. This is so because the dirt particles can better separate and deposit on the lamellae 11 configured in such a way.

In the embodiment shown, the lamellae 11 are arranged in a plane in the interior of the first housing part 6 in an extension to a wall 16 of the first housing part 6. This constructive measure improves the pressure stiffness of the operating substance tank. The filter wall can be configured as one piece with the second housing part 7 in lieu of being configured as one piece with the first housing part 6.

As shown in FIG. 3, the housing parts of the operating substance tank are connected to each other with the interposition of a solid material seal 18 which comes to lie on the partition surfaces 17 of the housing parts. The solid material seal 18 is preferably formed from a two-component sealing mass 19 which is sprayed onto a partition surface 17 and sets before the housing parts are connected to each other (see FIG. 4). The housing parts can be connected to each other form-tight, material-tight or force-tight so that, for example, a one piece operating substance tank is formed with a material tight connection of the two housing parts.

It is practical to form one or both housing parts of plastic, preferably fiber reinforced plastic. The wall thicknesses of the housing parts can be varied as desired in order to obtain a high mechanical resistance to load. Likewise, the filter wall 8 can, in lieu of lamellae 11, be made of a lattice or a perforated wall of the same material as the housing parts.

Figure 5:
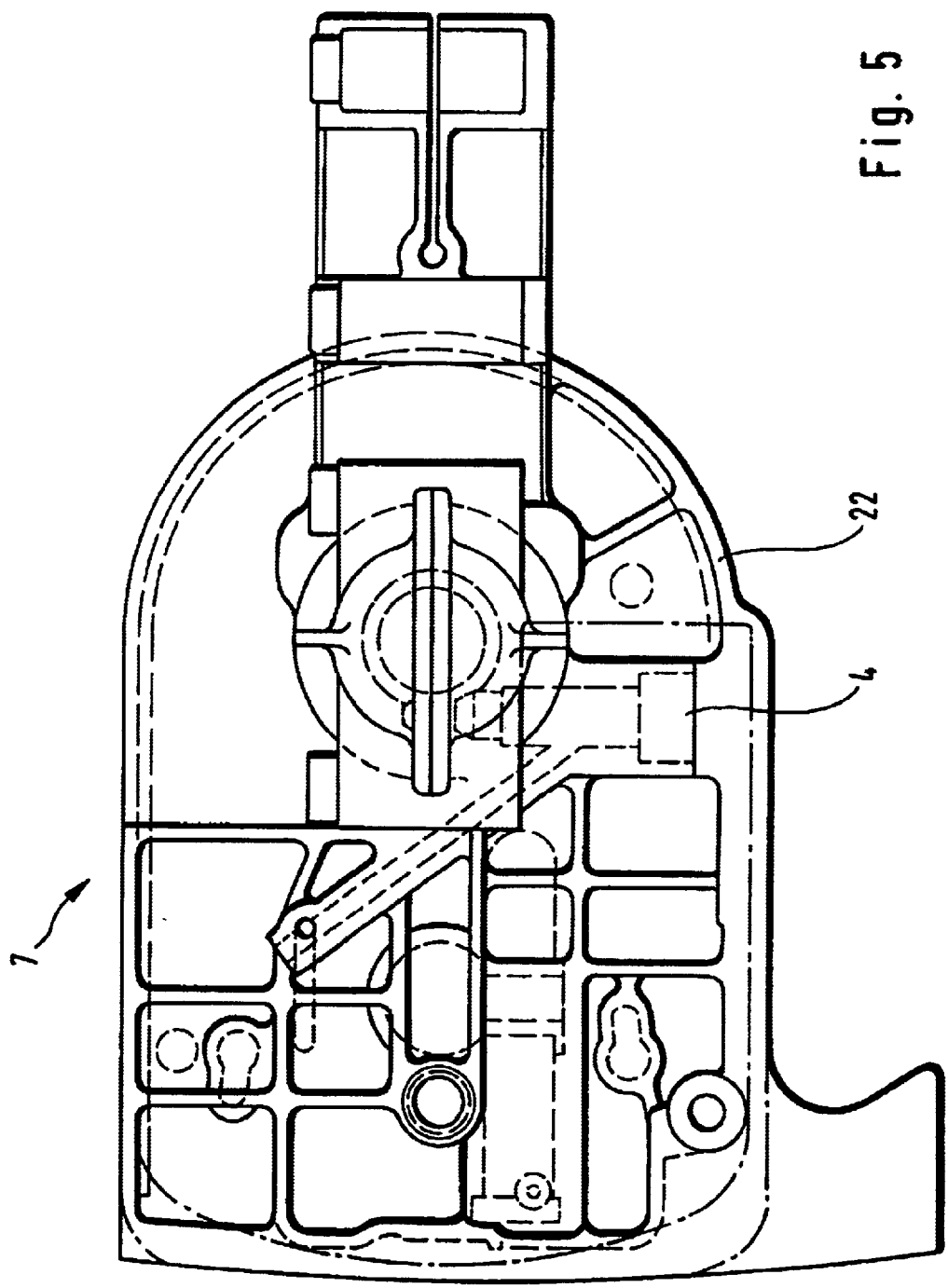
FIG. 5 is a plan view of a second housing part configured as an attachment flange of a work tool.

As shown in FIGS. 1, 2 and 5, the operating substance tank 1 is partially configured from the apparatus housing 21 (preferably an attachment flange 22) in a work apparatus 2 configured as an overhead branch cutter 20. In the embodiment shown, the second housing part 7 of the operating substance tank 1 is formed from the attachment flange 22 of the portable handheld work apparatus. The operating substance tank 1 is mounted on the side lying opposite the work tool 23 on the attachment flange 22 as shown in FIG. 1.

It is understood that the foregoing description is that of the preferred embodiments of the invention and that various changes and modifications may be made thereto without departing from the spirit and scope of the invention as defined in the appended claims.

What is claimed is:

1. An operating substance tank for a portable handheld work apparatus, the operating substance tank comprising:
    a tank housing having a tank interior and including a first housing part; and, a second housing part connected to said first housing part and defining said tank interior conjointly therewith;
    a filter wall for trapping contaminants contained in said operating substance and said filter wall being configured as one piece with said first housing part;
    said filter wall extending over the interior cross section of said tank so as to partition said tank housing into at least first and second spaces;
    said first housing part including a fill opening formed therein for filling said operating substance into said first space;
    said tank including an outflow connection through which said operating substance is drawn from said second space; and,
    said outflow connection being disposed in said second space downstream of said filter wall so that said contaminants are prevented by said filter wall from clogging said outflow connection as said operating substance is drawn by said work apparatus during operational use thereof.

2. The tank of claim 1, said filter wall comprising a plurality of individual lamellae and each two mutually adjacent ones of said lamellae conjointly defining a gap; and, said plurality of individual lamellae extending from a wall of said first housing part.

3. The tank of claim 2, said first and second housing parts conjointly defining a partition plane and said lamellae ending in said partition plane.

4. The tank of claim 2, each of said lamellae being configured to be S-shaped when viewed in cross section.

5. The tank of claim 1, said first space including said fill opening and said second space including said outflow connection.

6. The tank of claim 1, wherein said first housing part has a wall defining a plane extending into the interior thereof; and, said filter wall is mounted in said plane.

7. The tank of claim 1, said first and second housing parts having first and second partition surfaces, respectively, which conjointly define a partition interface; and, said tank further comprising a solid matter seal arranged at said partition interface; and, said first and second housing parts being connected to each other with said solid matter seal being disposed therebetween.

8. The tank of claim 1, wherein said first and second housing parts are made of plastic.

9. The tank of claim 8, wherein said first and second housing parts are made of fiber reinforced plastic.

10. The tank of claim 2, said lamellae being configured to be Z-shaped when viewed in cross section.

11. A work apparatus comprising:
    an apparatus housing;
    a tank for holding an operating substance and said tank including a tank housing;
    said tank housing having a tank interior and including a first housing part; and, a second housing part connected to said first housing part and defining said tank interior conjointly therewith;
    a filter wall for trapping contaminants contained in said operating substance and said filter wall being configured as one piece with said first housing parts part;
    said filter wall extending over the interior cross section of said tank so as to partition said tank housing into at least first and second spaces;
    said first housing part including a fill opening formed therein for filling said operating substance into said first space;

said tank including an outflow connection through which said operating substance is drawn from said second space;

said outflow connection being disposed in said second space downstream of said filter wall so that said contaminants are prevented by said filter wall from clogging said outflow connection; and, said second housing part being defined by said apparatus housing.

12. The work apparatus of claim 11, wherein said apparatus housing is in the form of an attachment flange.

13. The work apparatus of claim 12, wherein said work apparatus includes a work tool; said attachment flange having first and second ends; and, said attachment flange is connected to said substance tank at said first end and to said work tool at said second end.

* * * * *